(12) United States Patent
French

(10) Patent No.: US 8,555,723 B2
(45) Date of Patent: Oct. 15, 2013

(54) DEFECTIVE WHEEL BEARING DETECTION DEVICE

(76) Inventor: Joe French, Cedar Rapids, IA (US)

( * ) Notice: Subject to any disclaimer, the term of this patent is extended or adjusted under 35 U.S.C. 154(b) by 1001 days.

(21) Appl. No.: 12/591,397

(22) Filed: Nov. 18, 2009

(65) Prior Publication Data

US 2011/0113882 A1    May 19, 2011

(51) Int. Cl.
*G01M 13/02* (2006.01)
(52) U.S. Cl.
USPC ............................................ 73/593; 73/660
(58) Field of Classification Search
USPC .................... 73/577, 593, 649, 660, 662, 663
See application file for complete search history.

(56) References Cited

U.S. PATENT DOCUMENTS

| | | | |
|---|---|---|---|
| 1,467,373 A | 9/1923 | Gowin | |
| 2,776,814 A | 1/1957 | Sparks | |
| 2,818,830 A | 1/1958 | Kester | |
| 3,203,230 A | 8/1965 | Reiser | |
| 4,278,881 A * | 7/1981 | Mann | 250/227.21 |
| 4,494,410 A * | 1/1985 | Van Bochove et al. | 73/644 |
| 4,811,992 A * | 3/1989 | Steiner | 301/105.1 |
| 4,827,771 A * | 5/1989 | Cary et al. | 73/644 |
| 4,924,180 A * | 5/1990 | Nasr et al. | 324/207.15 |
| 5,585,577 A * | 12/1996 | Lemoine et al. | 73/866.5 |
| 5,877,433 A * | 3/1999 | Matsuzaki et al. | 73/862.381 |
| 6,161,962 A * | 12/2000 | French et al. | 384/459 |
| 6,234,022 B1 * | 5/2001 | Tadokoro | 73/593 |
| 6,619,849 B2 * | 9/2003 | Katano | 384/448 |
| 6,698,279 B1 | 3/2004 | Stevenson | 73/118.1 |
| 6,759,963 B2 * | 7/2004 | Hayes | 340/584 |
| 6,918,302 B2 * | 7/2005 | Yamada | 73/593 |
| 7,428,779 B2 | 9/2008 | Smith et al. | 33/203.18 |
| 7,497,131 B2 * | 3/2009 | Sentoku | 73/862.322 |
| 7,503,216 B2 * | 3/2009 | Yamada et al. | 73/593 |
| 7,543,499 B2 | 6/2009 | Stubenrauch et al. | 73/593 |
| 7,547,077 B2 * | 6/2009 | Melberg et al. | 301/108.1 |
| 7,686,516 B2 * | 3/2010 | Shibasaki et al. | 384/448 |
| 7,693,673 B2 * | 4/2010 | Luo et al. | 702/99 |
| 7,891,743 B2 * | 2/2011 | Ballard | 301/35.63 |
| 2002/0196989 A1 * | 12/2002 | Katano | 384/448 |
| 2007/0118333 A1 * | 5/2007 | Miyasaka et al. | 702/183 |

\* cited by examiner

*Primary Examiner* — Peter Macchiarolo
*Assistant Examiner* — Samir M Shah
(74) *Attorney, Agent, or Firm* — Jacobson Holman PLLC

(57) ABSTRACT

A front wheel drive bearing defect amplifier is attached to a wheel gauge mount. The amplifier includes a magnet which is positioned approximately at the center of the wheel assembly. A spacing block, including a hollow aluminum handle, is pivotally mounted onto the magnet. A shaft or pin interconnects the magnet and the aluminum block and allows rotation of the magnet, in fixed engagement with the wheel assembly. The shaft is loosely fitted through a hole in the block. Opposite ends of the shaft are rigidly secured with the magnet so as to rotate with the magnet. An aluminum tube defines a handle having one end of the handle force fitted into an opening in the aluminum block. An opposite end of the aluminum tube or handle is to be held by the hand of the operator.

8 Claims, 3 Drawing Sheets

DEFECTIVE WHEEL BEARING DETECTION DEVICE

FIELD OF THE INVENTION

The present invention relates to a device for identifying a defective wheel bearing while a wheel assembly, including the wheel bearing, is still mounted on an automobile.

BACKGROUND OF THE INVENTION

Modern automobiles, having front wheel drive, include a sealed wheel bearing. It is difficult, or impossible, to gain access to the wheel bearing for a visual inspection of the wheel bearing. Therefore, eccentricity of the wheel bearing can remain undetected until causing damage to a tire and affect overall smoothness of a ride of the automobile.

Repairs, therefore, encompass a complete replacement of a wheel bearing assembly, at a substantial expense. It is also possible to later learn that the wheel bearing was not defective and the same problems remain.

Prior practices to detect the presence of a defective wheel bearing include the use of a stethoscope. A stethoscope is used in an attempt to hear a vibration produced by a defective wheel bearing. However, rotation of the wheel by a drive shaft can adversely affect the sounds heard by the stethoscope. The drive shaft noises can be attributed to a defective wheel bearing and result in expensive replacement of a wheel bearing when the wheel bearing was not in need of replacement.

SUMMARY OF THE INVENTION

It is therefore an object of the present invention to provide a front wheel drive sealed bearing defect detector.

This object is accomplished by mounting a bearing defect detector assembly to the rim of a wheel on an automobile. The assembly may include an alignment wheel gauge mount, for example. However, any device which may be rigidly mounted on a wheel rim in secure engagement with the wheel rim is acceptable.

A front wheel drive bearing defect amplifier is then attached to the wheel gauge mount. The amplifier includes a magnet which is positioned approximately at the center of the wheel assembly. A spacing block, including a hollow aluminum handle is pivotally mounted onto the magnet. A shaft or pin interconnects the magnet and the aluminum block and allows rotation of the magnet, in fixed engagement with the wheel assembly. The shaft is loosely fitted through a hole in the block. Opposite ends of the shaft are rigidly secured with the magnet so as to rotate with the magnet.

An aluminum tube, defining a handle, has one end of the handle force fitted into an opening in the aluminum block. An opposite end of the aluminum tube or handle is to be held by the hand of the operator.

An automobile to be tested is elevated off of the floor. The wheel of the automobile is then manually rotated by an individual. The alignment wheel gauge mount or other device fixed to the rim of the wheel rotates with the wheel. The magnet mounted on the alignment wheel gauge mount also rotates with the wheel as does the shaft secured on opposite sides of the aluminum block.

The free end of the aluminum tube, acting as a handle, is held in a fixed position by the other hand of the individual. The aluminum tube and also the aluminum block are maintained in position while the wheel, the alignment wheel gauge mount and magnet are rotated.

If the wheel bearing of the wheel is defective, vibrations will be transmitted through the wheel, through the alignment wheel gauge mount, through the magnet and through the shaft mounting the magnet on the aluminum block. The vibrations will then be transmitted through the shaft mounting the magnet on the aluminum block to the aluminum tube, to be felt by the hand of the individual holding the aluminum tube at its free end. The presence of these vibrations is indicative of a defective bearing. The length of the tube, of approximately 18 to 24 inches, acts as a vibration amplifier for a vibration indicative of unevenness in the front wheel bearing.

By the present invention, the costs involved in dis-assembling a sealed wheel bearing assembly are avoided, while accurately detecting the presence of a defective wheel bearing.

Accordingly, it is another object of the present invention to detect vibrations in a sealed front wheel bearing by mounting a defective wheel bearing detection device onto a wheel assembly and amplifying vibrations caused by the bearing during rotation of the wheel assembly due to a presence of a defective or worn bearing.

It is another object of the present invention to mount an alignment wheel gauge mount on a wheel assembly and securing a magnet to the alignment wheel gauge mount with an extended length aluminum tube handle mounted at one end on the magnet so that rotation of the wheel assembly transmits vibration through the aluminum tube handle while amplifying vibrations caused by unevenness in a front wheel bearing to detect a defective or worn bearing.

It is still yet another object of the present invention to removably or permanently mount a magnet onto an alignment wheel gauge mount which is rotatable with a front wheel of an automobile and connecting an elongated handle to the magnet such that vibrations transmitted by the rotation of the wheel are amplified and transmitted to a remote end of the handle held by an individual to detect the presence of a defective or worn front wheel bearing.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

Figure 1:
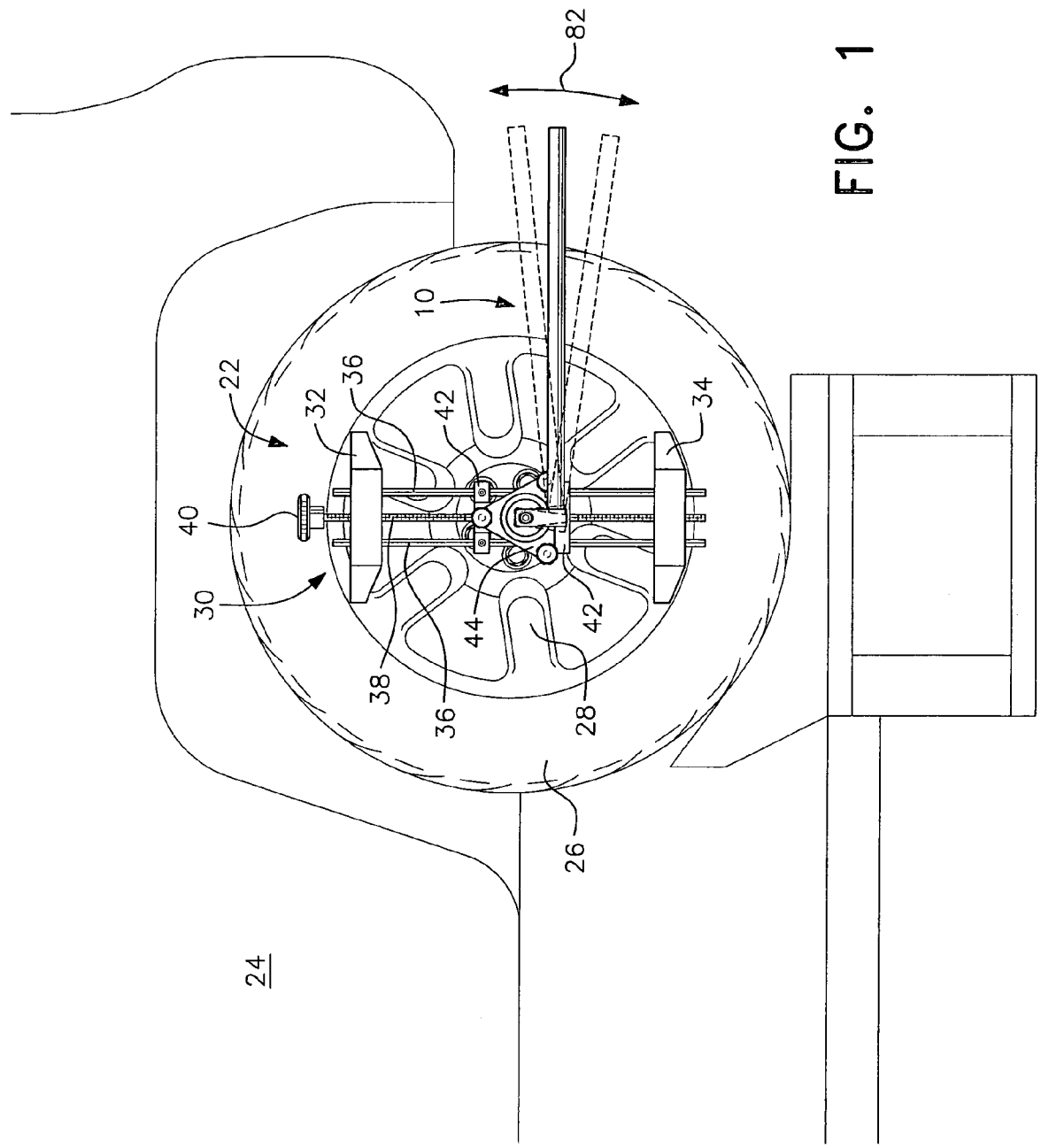
FIG. 1 illustrates the mounting of an alignment wheel gauge mount onto the front wheel assembly of an automobile, with an elongated handle extending away from the wheel to be held by the hand of an individual.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
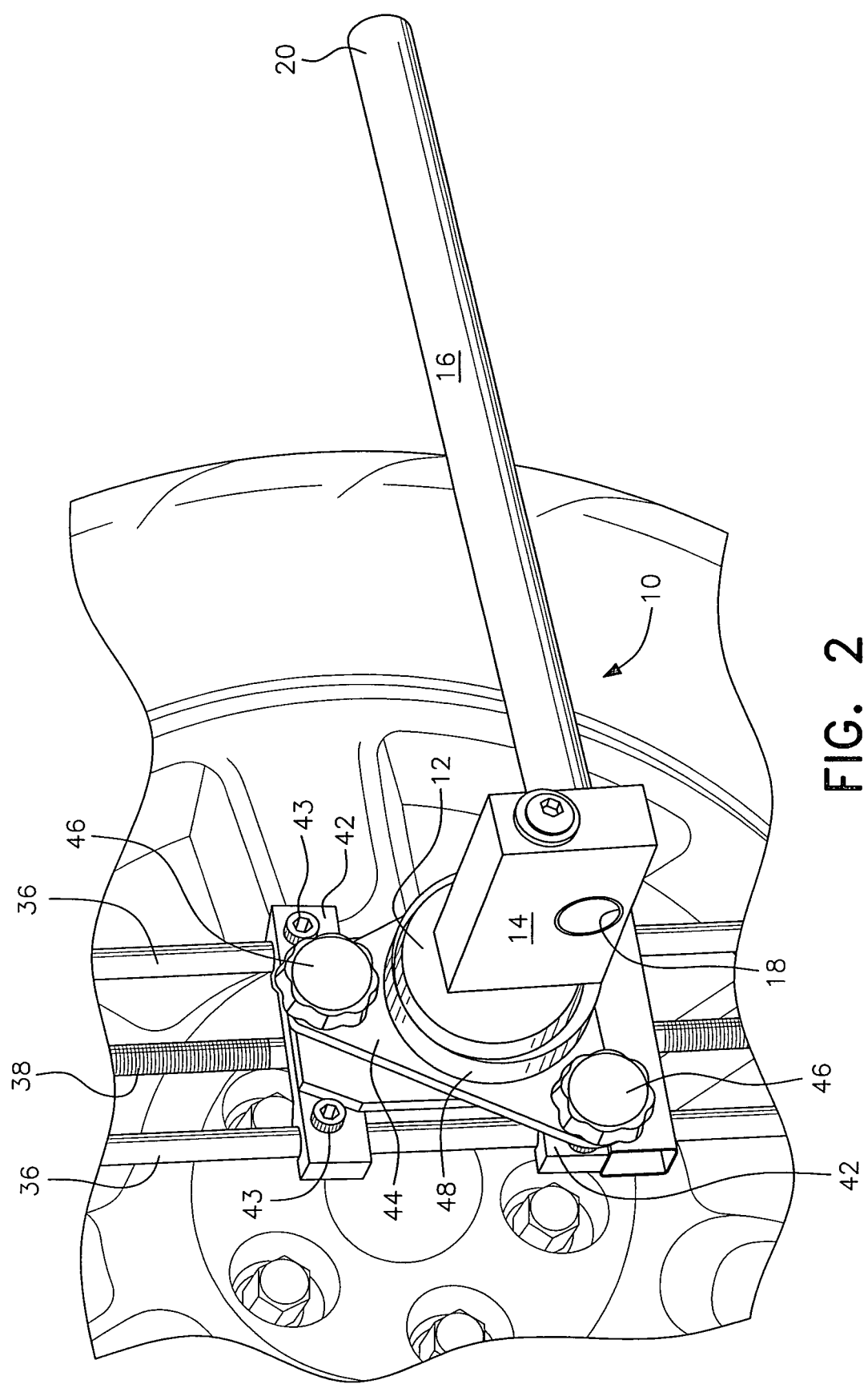
FIG. 2 is an enlarged perspective view of the assembly shown in FIG. 1 to illustrate the placement of a magnet on an alignment wheel gauge mount.
Figure 3:
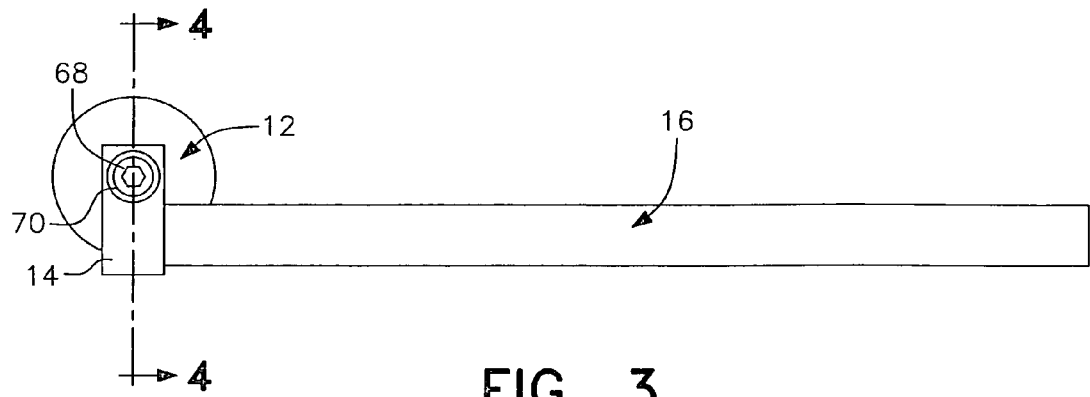
FIG. 3 illustrates the detection device for placement on an alignment wheel gauge mount, including a magnet, an aluminum block and an elongated handle.

With reference to the drawings, in general, and to FIGS. 1 and 2, in particular, a defective wheel bearing detection device embodying the teachings of the subject invention is generally designated as 10. With reference to its orientation in FIG. 1, the front wheel drive bearing defective detection device includes a magnet assembly 12 rotatably mounted on a block 14. A handle 16 includes one end 18 fixed in the block 14 and an opposite free end 20 extending perpendicular thereto, to be held by an individual.

The detection device is used in combination with a front wheel assembly 22 of an automobile 24. The front wheel assembly 22 includes a tire 26 and a rim 28 onto which the tire is mounted.

A secure interconnection between the wheel assembly 22 and the detection device 10 must be made. One example for obtaining this interconnection is achieved by the use of an alignment wheel gauge mount 30. The mount 30 includes two brackets 32, 34 which are rigidly interconnected with the rim 28 of the front wheel assembly 22. By a series of guide rods 36 and a threaded rod 38, including a rotatable handle 40, the brackets 32, 34 are spaced away from each other until firmly engaged with the rim 28. Two slide bars 42 are mounted onto the rods 36 for positioning of a triangular plate 44, approximately centrally with respect to the wheel assembly 22. A series of set screws 43 secure the bars 42 to the rods 36. A series of rotatable knobs 46 mount the plate 44 on the bars 42.

A disc 48 is positioned centrally on plate 44. Disc 48 is not required; it is only important that a flat metal engagement surface is provided by the alignment wheel gauge mount to space the handle 16 from hitting the wheel assembly when the wheel assembly is rotated.

With reference to the detection device, magnet assembly 12 is secured to the disc 48. Magnet assembly 12 includes a metal housing 50 having a flat flange portion 52 and depending sidewall 54 in an annular shape. Located within the housing 50 is an annular magnet 56. A hole 58 extends through the flange 52 and includes a beveled surface for engagement with beveled head 60 of set screw 62. Set screw 62 engages one end of a shaft or pin 64 which passes through three-inch wide aluminum block 14. A washer 66 is positioned between a sidewall of the block 14 and the flange 52.

At the opposite end of shaft or pin 64 is another set screw 68, engaging the opposite end of the pin 64 from set screw 60. A washer 70 is interposed between the sidewall of the block 14 and the head of the set screw 68.

Figure 4:
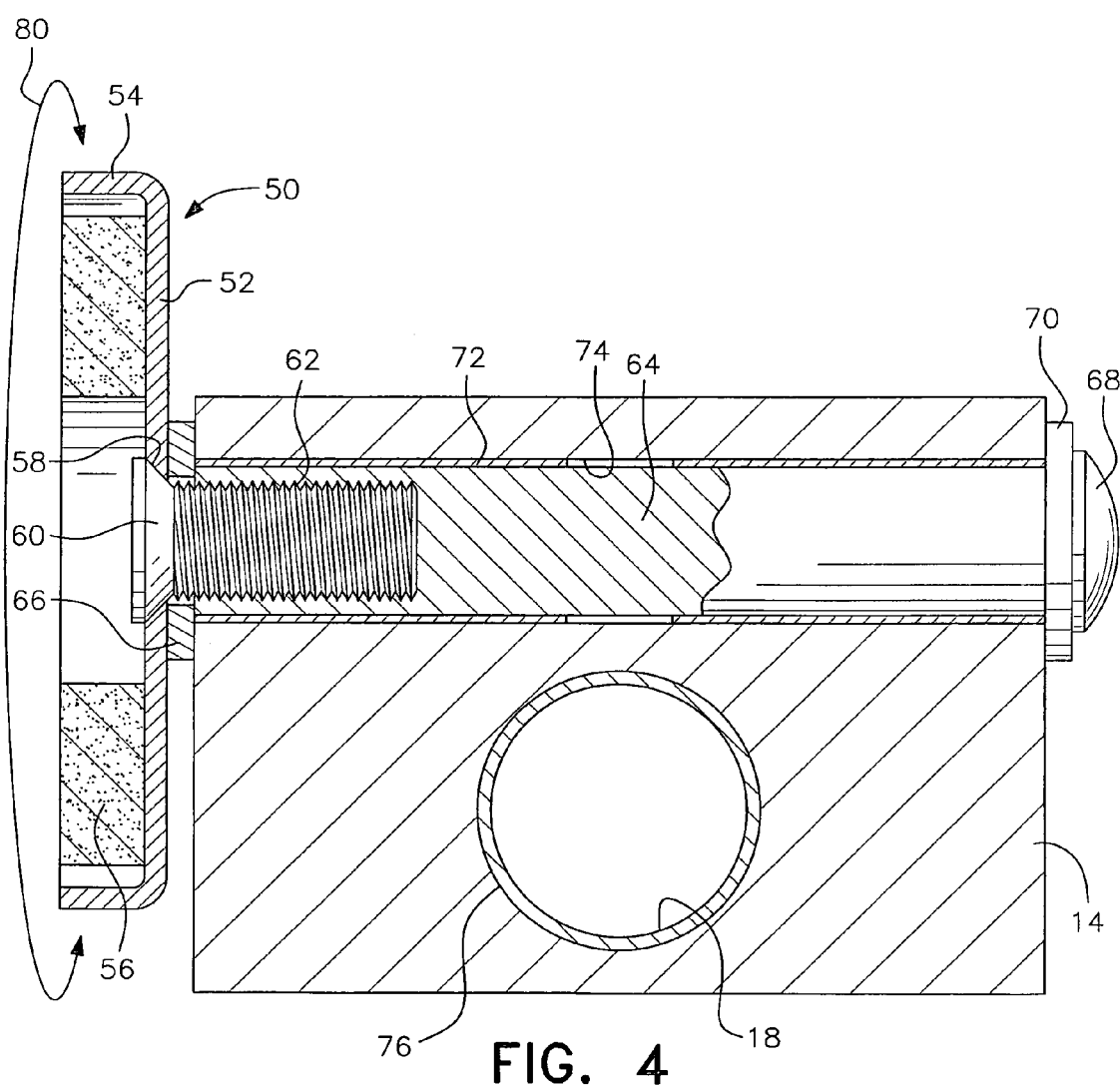
FIG. 4 is a cross-sectional view taken along line 4-4 of FIG. 3 to illustrate the interconnection of a shaft or pin extending through an aluminum block to rotatably mount an annular magnet on the block while a hollow tube handle is rigidly held in the block.

The housing 50, including the annular magnet 56, the pin 64, the set screws 60, 68 and the washers 66 and 70 all rotate together as a single unit with clockwise or counter-clockwise rotation of the magnet indicated by arrow 80 in FIG. 4. On a peripheral surface of the pin 64 is located an optional lubricated sleeve 72. The sleeve 72 helps in the rotation of the pin 64 with respect to the block 14. The sleeve 72 may be included or the pin 64 may directly engage with the borehole 74 in the block 14 to transmit vibrations from the pin 64 to the block 14.

End 18 of aluminum handle 16 is rigidly secured in block 14 by being form fitted into hole 76 of block 14. The opposite end 20 of the handle 16 projects away from the block 14 at a distance to clear away from the assembly the hand of an individual holding the end 18 of the handle 16.

The operation of the present invention includes the manual rotation of tire 26 by the right hand of an individual, for example. The left hand of the individual holds the end 20 of the handle 16 at any fixed position along a length of arrow 82 in FIG. 1. It is even possible for the individual to merely insert the index finger of their left hand into the end 20 of the hollow tube 16.

By the continued rotation of the tire 26, eccentric vibrations of the sealed front wheel bearing are transmitted through the alignment wheel gauge mount to the magnet 56 rotating with the tire. The pin 64, rigidly mounted to the housing 50 of the magnet 56, also transmits the vibrations. Any eccentricity in the front wheel sealed bearing is transmitted from the pin 64 to the block 14 and along a length of the tube handle 16 to the end 20. The vibrations are felt by the individual holding the end 20 of the handle 16. The vibrations are representative of a defective or worn front wheel bearing and an indication that the bearing needs to be replaced.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A bearing defect amplifier for mounting on a wheel assembly of a front wheel drive automobile, the wheel assembly including a tire mounted on a rim with the rim rotating on an axle of the automobile by a bearing, the bearing defect amplifier comprising:
   a rim mounting mechanism for mounting on the rim of the wheel assembly,
   a block mounted on the rim mounting mechanism, the block being stationary while the rim mounting mechanism is rotated with the rim, and
   a handle having two ends, one of the two ends of the handle being rigidly secured to the block, the other of the two ends being located remote from the block,
   the other end of the handle receiving vibrations from a defective bearing of the automobile during rotation of the tire.

2. The bearing defect amplifier as claimed in claim 1, wherein a pin rotatably mounted on the block is fixed to the rim mounting mechanism.

3. The bearing defect amplifier as claimed in claim 2, wherein the pin is mounted on the rim mounting mechanism by a magnet.

4. The bearing defect amplifier as claimed in claim 3, wherein the pin and the magnet are rigidly interconnected for rotation together while the block and the handle are fixed together and held immobile.

5. The bearing defect amplifier as claimed in claim 1, wherein the handle extends perpendicular to the block.

6. The bearing defect amplifier as claimed in claim 1, wherein the handle is hollow.

7. The bearing defect amplifier as claimed in claim 6, wherein the block and the handle are made of aluminum.

8. The bearing defect amplifier as claimed in claim 1, wherein a pin is mounted in the block by set screws located at opposite ends of the pin.

\* \* \* \* \*